UNITED STATES PATENT OFFICE.

HARRY A. CLARK AND EDWIN J. LARKIN, OF NEW ORLEANS, LOUISIANA, ASSIGNORS, BY MESNE ASSIGNMENTS, TO CHARLES W. BENEDICT, OF ST. LOUIS, MISSOURI.

RUBBER-LIKE SUBSTANCE AND PROCESS OF MAKING SAME.

1,076,349.     Specification of Letters Patent.     Patented Oct. 21, 1913.

No Drawing.    Application filed March 1, 1912, Serial No. 680,969. Renewed November 21, 1912. Serial No. 732,300.

*To all whom it may concern:*

Be it known that we, HARRY A. CLARK and EDWIN J. LARKIN, citizens of the United States, residing at New Orleans, in the parish of Orleans and State of Louisiana, have invented new and useful Improvements in Rubber-like Substances and Processes of Making Same, of which the following is a specification.

This invention relates to a process of producing a rubber-like substance which is elastic, resilient, tough and tenacious, of high tensile strength and durability, highly resistant to heat, friction, oils, benzin and other solvents, and capable of use for many purposes as a substitute for rubber, and particularly as an elastic filler for the inner tubes of pneumatic tires.

The primary object of the invention is to provide a process of making a rubber-like substance of that general class formed of gelatin, glycerin and chromates, but which, unlike prior compositions of this character, will not harden by oxidation or continued use, but will retain a cushion-like resiliency for an indefinite period of time, a desideratum in the use of the composition as a tire filler or for any purpose where a continuous elasticity or resiliency is required.

In carrying our invention into practice, we first dissolve 5 ozs. of commercial gelatin in 5 ozs., by weight, of pure water, and then add thereto 5 ozs. of glycerin. This mixture is heated to about 150° F. and cooked while being well stirred for about ½ hr. To the mixture thus prepared is then added ½ oz. of lead plaster, which is then cooked and stirred well for another ½ hr. To the mixture is then added ½ oz. sulfurized linseed oil, free from free sulfur, and the mixture heated to 150° F. for another period of ½ hr., after which the composition is completed by the addition of ¼ oz. sodium dichromate, mixed in 2 oz. black strap molasses, the whole being rapidly stirred and thoroughly mixed, when the composition is ready for use.

In the production of substitute rubber goods or articles of any kind, the composition is poured into molds, or if it is to be used as a filler for tire tubes it is forced into the tube by compressed air, hydraulic pressure, or the action of a pump or screw, the material being maintained under a pressure of from 45 to 100 lbs., according to the character of the article to be molded, and the composition then subjected to heat for a period of from 4 to 5 hrs. at a temperature of from 150° to 250° F. according to the degree of firmness of texture and resiliency which it is desired to obtain.

The lead plaster acts as a binder securing perfect cohesion of the particles and gives tensile strength and toughness to the mass, and in this composition also maintains the insolubility and elasticity of the glue, glycerin and chrome salt combination and increases the resistance of the product to moisture and water. The sulfurized linseed oil, free from free sulfur, coöperates with the lead plaster to maintain the product in a permanently elastic and resilient state, and prevents it from oxidizing and hardening when exposed to the atmosphere or from continued use, in which respect the composition differs materially from the usual combinations of gelatin, glycerin and chromates, which harden or disintegrate more or less rapidly from oxidation and age. While other chrome compounds may be used, sodium dichromate is preferred. Sodium dichromate, unlike chromate of potash or bichromate of potash, commonly used in other processes, gives all the results of the two former, but unlike them it renders the product practically free from the effects of water and moisture when employed in the combination and under the method of manufacture above described. The glycerin gives elasticity and resiliency to the mass, while the molasses, or its substantial equivalent, acts as a solvent for the chromate and as a retarder to restrain the setting of the substance under the action of the chromate to a sufficient degree to enable it to be injected into the tire in a fluid condition. By dissolving the gelatin in water and glycerin, instead of, as usual, simply softening the gelatin in water or steam and wholly driving off the moisture when the glycerin is added thereto, sufficient moisture is retained in the product to limit its hydroscopicity to a desired degree. The product produced by our process also has very high tensile strength, resists heat, friction, oils and benzin or other solvents to a high degree, and retains its resiliency for an indefinite period under continued service, which renders it of great value as a filler for pneumatic tires.

Practical demonstration has shown that an inner tube filled with our product is not only rendered puncture-proof, but has practically the same amount of resiliency as though filled with air, and is further sufficiently elastic that it may by suitable means be transferred from one tire casing to another without injury. Another advantage of the product is that the lead plaster and sulfurized linseed oil control and modify the elasticity or resiliency of the mass so as to render it of peculiar value as a tire filler, in that the tire is made sufficiently fast or resilient to absorb shocks or jars without reacting or rebounding suddenly enough to transfer vibratory motion to the vehicle, thus overcoming a well-known objection to air-filled tires or fillers of high resiliency.

The sulfurized linseed oil employed in our composition is obtained by treating linseed oil with sulfur-chlorid in the proportions of one part by weight of sulfur-chlorid to ten parts of linseed oil. A larger proportion of sulfur-chlorid may be used to secure a harder product, and the proportions of the other ingredients may be modified to a certain extent according to the degree of density, resiliency and tenacity which it is desired to secure. In place of linseed oil any other similar oil of the fatty group may be employed.

Having thus described the invention, what we claim as new is:—

1. The herein described process of producing a rubber-like substance, which consists in preparing a mixture of gelatin, water and glycerin; heating said mixture; then adding lead plaster to said mixture and heating the same; adding sulfurized linseed oil free from free sulfur to the mixture thus produced and further heating the same; and finally adding a chrome salt to the mixture, substantially as described.

2. The herein described process of producing a rubber-like substance, which consists in preparing a mixture of gelatin, water and glycerin; heating said mixture; then adding lead plaster to said mixture and heating the same; adding sulfurized linseed oil free from free sulfur to the mixture thus produced and further heating the same; and finally adding sodium di-chromate to the mixture, and again heating the same, substantially as described.

3. The herein described process of producing a rubber-like substance, which consists in first combining under the action of heat a mixture of gelatin, water and glycerin; then adding lead plaster and heating again; then adding sulfurized linseed oil free from free sulfur; and finally adding a chrome salt, and heating the mixture while under pressure, substantially as described.

4. The herein described process of producing a rubber-like substance, which consists in combining under the action of successive heatings a mixture of gelatin, water, glycerin, lead plaster, sulfurized linseed oil free from free sulfur, and sodium di-chromate, and then heating the mixture while under pressure, substantially as described.

5. The herein-described process of producing a rubber-like substance, which consists in dissolving gelatin in water, incorporating glycerin therewith, stirring and heating the mixture, adding thereto lead plaster and sulfurized linseed oil free from free sulfur while still stirring and heating the mixture, then adding sodium dichromate dissolved in molasses, and then heating the mixture.

6. A rubber-like composition composed of the following ingredients and in substantially the following proportions by weight:— glycerin, five ounces; water, five ounces; gelatin, five ounces; lead plaster one-half an ounce; sulfurized linseed oil free from free sulfur, one-half an ounce, and an alkali metal chromate, one-fourth of an ounce.

7. A rubber-like composition composed of the following ingredients and in substantially the following proportions by weight:— glycerin, five ounces; water, five ounces; gelatin, five ounces; lead plaster, one-half an ounce; sulfurized linseed oil free from free sulfur, one-half an ounce; and sodium dichromate, one-fourth of an ounce.

8. The herein described process of producing a rubber-like substance, which consists in preparing under the action of heat a suitable plastic mixture containing gelatin, glycerin and water; adding lead plaster to said mixture; adding sulfurized linseed oil free from free sulfur to said lead plaster and mixture; and adding an alkali metal chromate to the mass thus produced, substantially as described.

9. The herein described process of producing a rubber-like substance which consists in preparing under the action of heat a suitable plastic mixture containing glycerin; adding lead plaster to said mixture and further heating the same; adding sulfurized linseed oil free from free sulfur to said lead plaster and mixture; and adding an alkali metal chromate to the mass thus produced, substantially as described.

10. The herein described process of producing a rubber-like substance which consists in preparing under the action of heat a suitable plastic mixture containing gelatin and glycerin; adding lead plaster to said mixture and further heating the same; adding sulfurized linseed oil free from free sulfur to said lead plaster and mixture; and adding an alkali metal chromate to the mass thus produced dissolved in a medium capable of retarding the setting of the said mass; substantially as described.

11. The herein described process of producing a rubber-like substance which consists in combining under the action of heat a suitable plastic mixture containing lead plaster and sulfurized linseed oil free from free sulfur whereby an action is created tending to prevent the mass from oxidizing and hardening, substantially as described.

12. A rubber-like composition of the character described containing lead plaster and sulfurized linseed oil free from free sulfur tending to prevent said composition from oxidizing and hardening, substantially as described.

13. A rubber-like composition of the character described containing gelatin, glycerin, lead plaster and sulfurized linseed oil free from free sulfur tending to prevent said composition from oxidizing and hardening, substantially as described.

14. A rubber-like composition of the character described containing an alkali metal chromate, lead plaster and sulfurized linseed oil free from free sulfur tending to prevent said composition from oxidizing and hardening, substantially as described.

In testimony whereof we affix our signatures in presence of two witnesses.

HARRY A. CLARK,
EDWIN J. LARKIN.

Witnesses:
CAMILLE MASSON,
FLORENCE FLYNN.